Oct. 6, 1953     P. O. STELLING ET AL     2,654,771
METHOD FOR CONDUCTING THE GRIGNARD REACTION
TO PRODUCE ORGANOSILICON COMPOUNDS
Filed Feb. 27, 1948     2 Sheets-Sheet 1
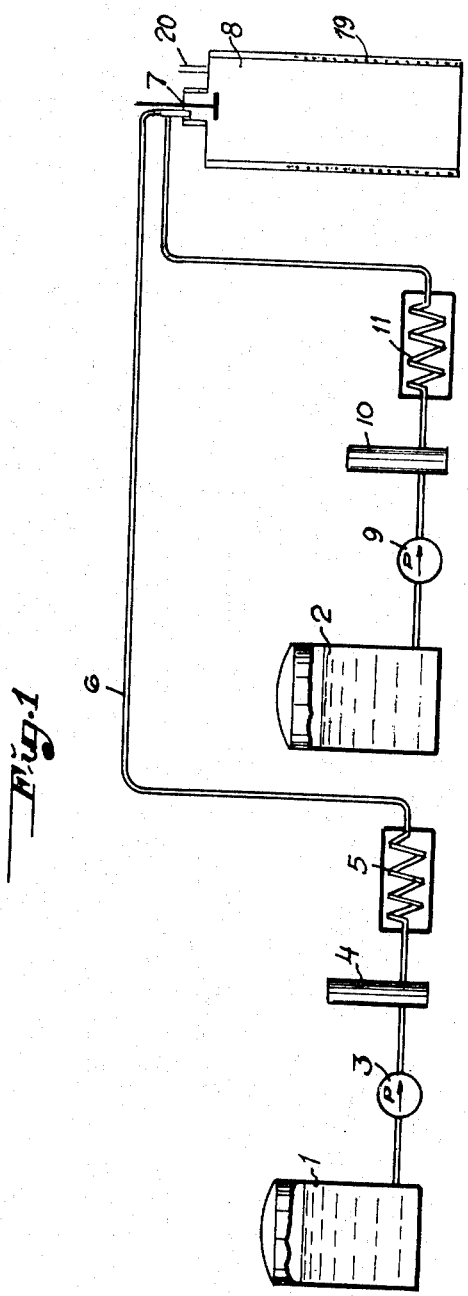
INVENTORS
PER OTTO STELLING
& LENNART G. FLEMMERT
BY Young, Emery & Thompson
ATTYS-

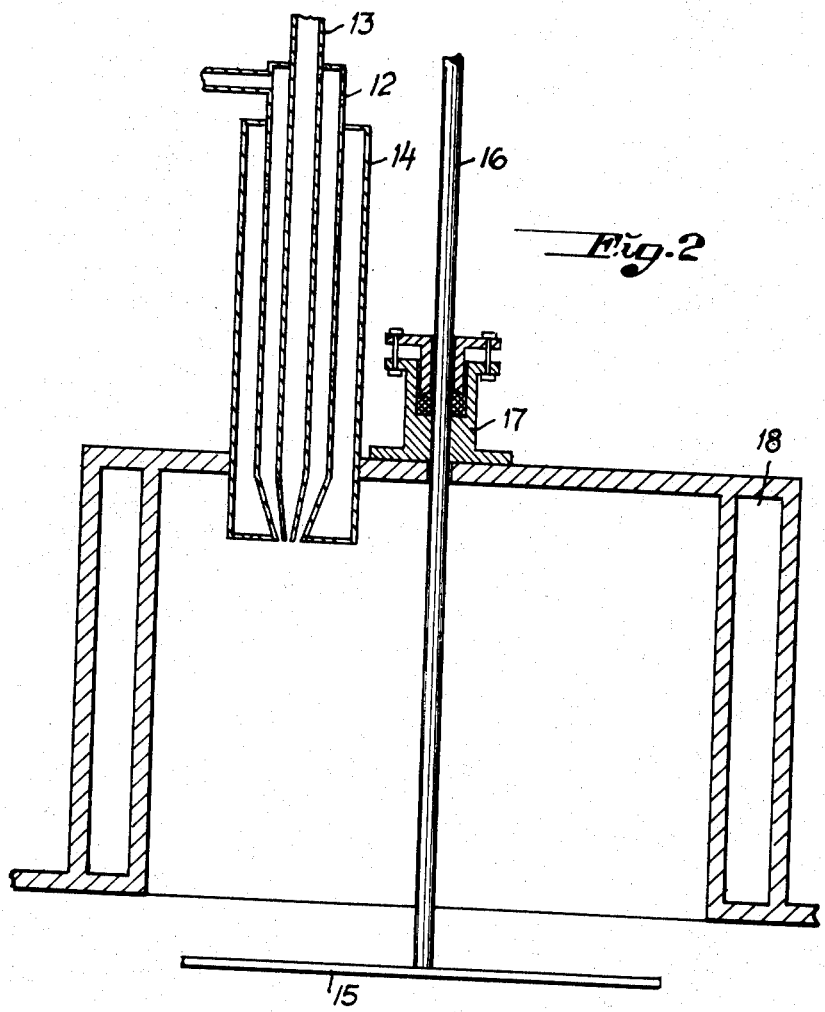

UNITED STATES PATENT OFFICE 2,654,771

METHOD FOR CONDUCTING THE GRIGNARD REACTION TO PRODUCE ORGANOSILICON COMPOUNDS

Per Otto Stelling and Gösta Lennart Flemmert, Stockholm, Sweden, assignors to Mo Och Domsjo Aktiebolag, Ornskoldsvik, Sweden, a corporation of Sweden Application February 27, 1948, Serial No. 11,656
In Sweden March 8, 1947

10 Claims. (Cl. 260—448.2)

It is known to produce organic silicon compounds by reacting a silicon-halogen compound, which may be completely or incompletely esterified, with a Grignard reagent, for instance according to the following formulae:

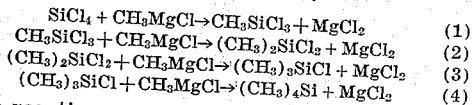

The reaction may be interrupted at any stage so that mainly the desired reaction product, such as dimethyldichlorosilane, for instance according to Formula 2, is obtained.

The reaction is usually carried out in a solvent, such as diethyl-ether. Generally, the Grignard reagent is added to the silicon-halogen compound diluted with the solvent while agitating and cooling the latter whereupon the volatile components are driven off or are otherwise separated from the magnesium halide.

The method defined above suffers from several considerable drawbacks some of which will be described in the following.

(a) As appears from the above formulae magnesium halide is formed at the reaction. This halide is precipitated in a very voluminous form so that the agitation necessary for effectively carrying out the reaction will become more and more difficult. For this reason it is necessary to work with solutions diluted with large quantities of solvent or else the solvent may be replaced by a great excess of the silicon-halogen compound so that the latter will itself serve as a diluent. In both cases the content of the reaction mix of the desired compound or compounds will be low.

(b) Difficulties are encountered in driving off the volatile components due to the presence of the magnesium halide precipitate which forms in the still a layer of low thermal conductivity.

(c) The reactions are strongly exothermic and the Grignard reagent therefore must be added slowly and with cooling so that volatile components, for instance ether, are not vaporized due to the reaction heat.

It has been found that all of the abovementioned drawbacks may be eliminated and the process carried out in a single step if the reaction components are brought into intimate contact with one another in such a manner as to obtain a fine dispersion of the reaction mix and a rapid vaporization of the volatile components thereof, the latter being then recovered, for instance by condensation. This manner of proceeding characteristic of the present invention may be used generally for the production of completely or incompletely alkyl, aryl or aralkyl substituted silanes and halosilanes or of their complete or incomplete esters or of mixtures of such compounds, for instance of the formulae

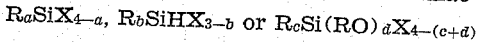

where R denotes an alkyl, aryl or aralkyl group or similar or dissimilar alkyl, aryl or aralkyl groups, $a$ is a number not exceeding 4, $b$ is a number not exceeding 3, and $c$ and $d$ are numbers lower than 4 and whose sum does not exceed 4, by reacting a silicon-halogen compound or a complete or incomplete ester of a silicon-halogen compound with a Grignard reagent of the type RMgX or R$_2$Mg, where R consists of, or contains, an alkyl, aryl or aralkyl group and X denotes a halogen.

Examples of compounds which may be produced according to the present invention are:

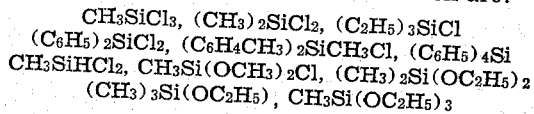

According to the present invention there may be used as a silicon-halogen compound or as an ester derived therefrom a compound of the type:

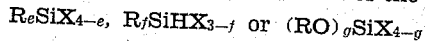

where R denotes an alkyl, aryl or aralkyl group or similar or dissimilar alkyl, aryl or aralkyl groups, $e$ is a number lower than 4, for instance between 0 and 3, $f$ is a number lower than 3, for instance between 0 and 2, and $g$ is a number not exceeding 4.

Examples of such silicon-halogen compounds and esters derived therefrom, respectively, are:

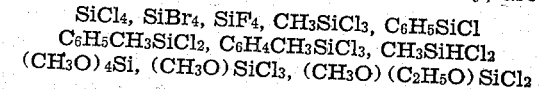

Above examples are given both of obtainable final products and of silicon-halogen compounds or esters derived therefrom which may be used. The composition of the Grignard reagent is of course selected in such a manner that the desired hydrocarbon radical or radicals is or are linked to the Si-atom of the other reaction component.

Before or simultaneously with the introduction of the silicon-halogen compound or of the ester derived therefrom and/or of the Grignard reagent into the reaction system an inert diluent, such as ether or benzene, is preferably added. Such addition has a favorable influence upon the yield by rendering the occurrence of a local excess of Grignard reagent more difficult.

The invention will be more clearly explained in the following with reference to the accompanying drawings, wherein:

Fig. 1 is a diagrammatic view of a plant suitable for carrying out the process, and Fig. 2 is a partial cross-sectional view on a larger scale of a device for bringing together the reaction components and for spreading the reaction products.

In Fig. 1 reference numerals 1 and 2 denote vessels for Grignard reagent and for silicon-halogen compound, respectively. By means of the pump 3 the Grignard reagent is forced through the flowmeter 4, the cooling coil 5 and the pipe line 6 into and out of the inner tube of the nozzle device according to Fig. 2, which is more fully described in the following, said device (denoted 7) being arranged in the upper part of the reaction tower 8 which is made from sheet steel. The liquid silicon-halogen compound is forced by the pump 9 through the flowmeter 10 and the cooling coil 11 into and out of the outer tube of the device 7 which will now be more closely described. The same comprises two tubes of which an outer tube 12 surrounds an inner tube 13. The lower ends of the tubes have a conical taper, as appears from Fig. 2, forming two concentrically spaced nozzles. If desired, the nozzles may be cooled or heated, and they may also be provided with cleaning devices. In Fig. 2 there is shown a jacket 14, and between this jacket and the tube 12 liquid of a suitable temperature may circulate. From the nozzles formed by the tubes 13 and 12, respectively, Grignard solution from the vessel 1 and silicon-halogen compound, respectively, are ejected. The reaction components thus brought together are directed perpendicularly towards the baffle 15 which, in the embodiment shown, rotates by being mounted on a shaft 16 driven by a motor (not shown). The shaft 16 extends through the top of the reaction tower, a fluid tight seal being obtained by means of a stuffing box 17. When leaving the nozzles the reaction components are brought together so that the reaction will start immediately. At the impact of the jet against the rotating surface 15 the reaction components are brought into intimate contact with one another so that the reaction will be completed. Also a fine dispersion of the reaction mix is obtained. It has been found that in this way and by using a plant of relatively small dimensions a very high capacity is obtainable simultaneously as the yield of desired products is very satisfactory.

The nozzle device 7 my of course be arranged differently from what is shown in Fig. 1. Thus, for instance, it may often be advantageous to arrange the same in such a manner that the jet of the reaction mix is ejected in horizontal direction in the tower and tangentially with respect to the inner cylindrical wall thereof, similarly as in a cyclone. In this way the dust separating power of the tower is increased.

The tower may be provided with continuously or discontinuously operating discharge means (not shown) for solid reaction products. It may also be provided with heating or cooling means so that different temperatures may be maintained in different sections of the same. For instance, the upper section of the tower, where the reaction takes place, may be provided with a hollow jacket 18 through which a cooling liquid circulates. Furthermore, the tower 8 may be surrounded by an electrical heating coil 19. The jacket 18 serves to cool the reaction zone proper so that the reaction is carried out mainly in the liquid phase, this giving the advantage of a higher yield in most cases (for instance in the production of dialkyldichlorosilane). If, on the other hand, tetra-substituted silanes are to be produced, cooling of the reaction zone is not necessary. The object of the heating coil 19 is to bring about a rapid and complete distillation of volatile components from the magnesium halide. When working according to the principles of the present invention this distillation may be carried out more effectively and rapidly than in methods hitherto known.

From the baffle plate 15 the reaction mix is spread in the form of fine droplets consisting of formed silane compound, magnesium halide, unreacted silicon-halogen compound and solvent. It is suitable, therefore, to have the reaction vessel heated in such a manner that there prevails at least in a section of the same a temperature which is higher than the boiling point of the volatile components of the reaction mix. In this way the result is obtained that the aforesaid volatile components, substituted silane compounds, solvent and possible excess of silicon-halogen compound or ester thereof are vaporized. The vapors escape from the tower 8 through the pipe 20. In one embodiment of the apparatus they are then passed to a continuously operating still, such as a column still, in which the various components are separated from one another so that substituted silane compounds, solvent and excess of silicon-halogen compound are recovered separately. Unreacted silicon-halogen compound may be recovered and re-introduced into the process, i. e. it may be caused to react with a further amount of Grignard reagent.

A further possibility is to condense directly the vapors escaping from the pipe 20, for instance in an ordinary cooler. The various components are then obtained in the form of a mixture which may either be passed to a still for separating the components or else may be recycled through the reaction system without previous separation and caused to react with a further amount of Grignard reagent.

The process according to the present invention may be carried out at normal pressure, reduced pressure or increased pressure. In most cases it is possible to work at atmospheric pressure but when dealing with high-boiling reaction components or reaction products, for instance phenyl substituted silanes, it has proved to be suitable to use pressures which are lower than the atmospheric pressure since the vaporization of the reaction components or the reaction products is thereby facilitated.

To enable working at an elevated temperature when dealing with low-boiling reaction components or reaction products it may sometimes be suitable to carry out the reaction at superatmospheric pressure.

In the following some examples of the production of substituted halosilanes using the apparatus shown in Figs. 1 and 2 are described.

*Example 1*

In the reaction tower 8 there were introduced through the nozzle device 7 during a period of 1 hour 64.4 mol of $SiCl_4$ and 10.0 mol of $CH_3MgCl$ (dissolved in diethylether to a concentration of 2.68 mol/litre). Both the $SiCl_4$ and the Grignard solution were cooled by means of the cooling coils 5 and 11 so that the temperature in the reaction zone just outside the nozzle device did not exceed 30° C. In the reaction tower normal atmospheric pressure prevailed. By means of the heating coil 19 the lower section of the tower (still section) was heated to a temperature of about 175° C. The vapors escaping through the pipe 20 were condensed and the condensate was subjected to analysis. It was found that 85.3% of the methyl groups present had been converted into methyltrichlorosilane, $CH_3SiCl_3$, and 6.6% to dimethyldichlorosilane, $(CH_3)_2SiCl_2$.

*Example 2*

The process was carried out under the same conditions as in Example 1 except that the mol ratio between silicon-halogen compound and Grignard solution was reduced to 4.

The following yields calculated upon $CH_3$— groups present were obtained:

| | Percent |
|---|---|
| $CH_3SiCl_3$ | 69.2 |
| $(CH_3)_2SiCl_2$ | 16.0 |

*Example 3*

The condensate of the vapors escaping from the pipe 20 in Example 1 was passed to the empty vessel 2. The pumps 3 and 9 were then started forcing said condensate and Grignard reagent from the vessel 1 into the tower 8 in such proportions that the ratio of Si to $CH_3$ in the reaction product was 2.64. In practice this means that 0.5 volume units of 2.68-n Grignard solution had to be added per volume unit of condensate, i. e. there were introduced per hour 7.48 litres of condensate and 3.74 litres of Grignard solution. The temperature and other conditions were in accordance with those stated in Example 1.

The following yields counted upon $CH_3$— groups present, were obtained:

| | Percent |
|---|---|
| $CH_3SiCl_3$ | 67.5 |
| $(CH_3)_2SiCl_2$ | 20.8 |

From Examples 1 and 2 it appears that the yield of monomethyltrichlorosilane is increased with increasing excess of $SiCl_4$.

As regards methyl substituted chlorosilanes it has been found to be advantageous from an economical point of view to work with a mol ratio between $SiCl_4$ and Grignard reagent of from 0.5 to 4.

Example 3 describes how part of the condensate obtained in the process, without being first separated into components, is re-cycled through the reaction system and is caused to react therein with a further amount of Grignard reagent. From a comparison between Examples 2 and 3 it appears that through this re-cycling step the yield of monomethyltrichlorosilane added to that of dimethyldichlorosilane is increased by about 3% simultaneously as the excess of $SiCl_4$ is materially reduced which, in turn, facilitates the separation of the silanes from the reaction mix.

What we claim is:

1. In a process for producing organosilicon compounds, the steps of reacting, in the form of a finely dispersed liquid mix, a silicon compound selected from the group consisting of halides, esters and halide-esters, with a Grignard reagent, and of removing volatile components including formed organosilicon reaction products from said mix by vaporization while the mix is finely dispersed.

2. In a process for producing organosilicon compounds, the steps which comprise injecting a liquid silicon compound selected from the group consisting of halides, esters and halide-esters and a solution of Grignard reagent in the form of pressure jets into a reaction space, intimately mixing and dispersing said components in the form of a spray by impact, and heating said spray for removing therefrom volatile components including formed organosilicon reaction products.

3. A process for producing organosilicon compounds, which comprises reacting a silicon compound selected from the group consisting of halides, esters and halide-esters, with a solution of Grignard reagent in the form of a finely dispersed liquid mix, removing volatile components including formed organosilicon reaction products from said mix by vaporization while the mix is finely dispersed, fractionating the volatile components thus vaporized for separating desired organosilicon reaction products from unreacted silicon compounds, and reacting the latter with further amounts of Grignard reagent.

4. In a process for producing organosilicon compounds, the steps which comprise reacting a silicon compound selected from the group consisting of halides, esters and halide-esters with a solution of Grignard reagent in the form of a finely dispersed liquid mix, removing volatile components including formed organosilicon reaction products from said mix by vaporization while the mix is finely dispersed, condensing the vaporized components, and reacting a portion of the condensate with further amounts of Grignard reagent.

5. In a process for producing organosilicon compounds, the steps which comprise reacting a silicon compound selected from the group consisting of halides, esters and halide-esters with a Grignard reagent in the form of a finely dispersed solution in an inert solvent, and removing volatile components including formed organosilicon reaction products, unreacted starting materials and solvent by vaporization while the mix is finely dispersed.

6. A process according to claim 1, wherein in the case of high-boiling organosilicon reaction products a subatmospheric pressure is maintained in the reaction space.

7. In a process for producing organosilicon compounds, the steps which comprise reacting a silicon compound selected from the group consisting of halides, esters and halide-esters with a Grignard reagent in the form of a finely dispersed liquid mix at a low temperature and subsequently heating said dispersed mix to a temperature sufficient to vaporize substantially all of the volatile components therein including the formed organosilicon reaction products.

8. A process according to claim 7, wherein the finely dispersed liquid reaction mix is allowed to descend from an upper reaction zone maintained at a relatively low temperature to a lower heating zone in which the volatile components including the formed organosilicon reaction products are vaporized.

9. In a process for producing organosilicon compounds, the steps of reacting, in the form of a finely dispersed mix as liquid droplets, a reactive substituted silane with a Grignard reagent, and of removing volatile components including formed organosilicon reaction products from said mix by vaporization while the mix is finely dispersed.

10. A process according to claim 1, wherein in the case of low boiling organosilicon reaction products a pressure above atmospheric pressure is maintained in the reaction space.

PER OTTO STELLING.
GÖSTA LENNART FLEMMERT.

References Cited in the file of this patent

UNITED STATES PATENTS

| Number | Name | Date |
| --- | --- | --- |
| 1,284,488 | Steward | Nov. 12, 1918 |
| 1,629,200 | Buhtz | May 17, 1927 |
| 2,413,049 | Hyde | Dec. 24, 1946 |
| 2,426,122 | Rust | Aug. 19, 1947 |
| 2,478,707 | Purvin | Aug. 9, 1949 |